Aug. 27, 1963　　　O. H. BANKER　　　3,101,594
HYDRAULIC SYSTEM INCORPORATING FLOW DIVIDER VALVES
Original Filed May 16, 1957
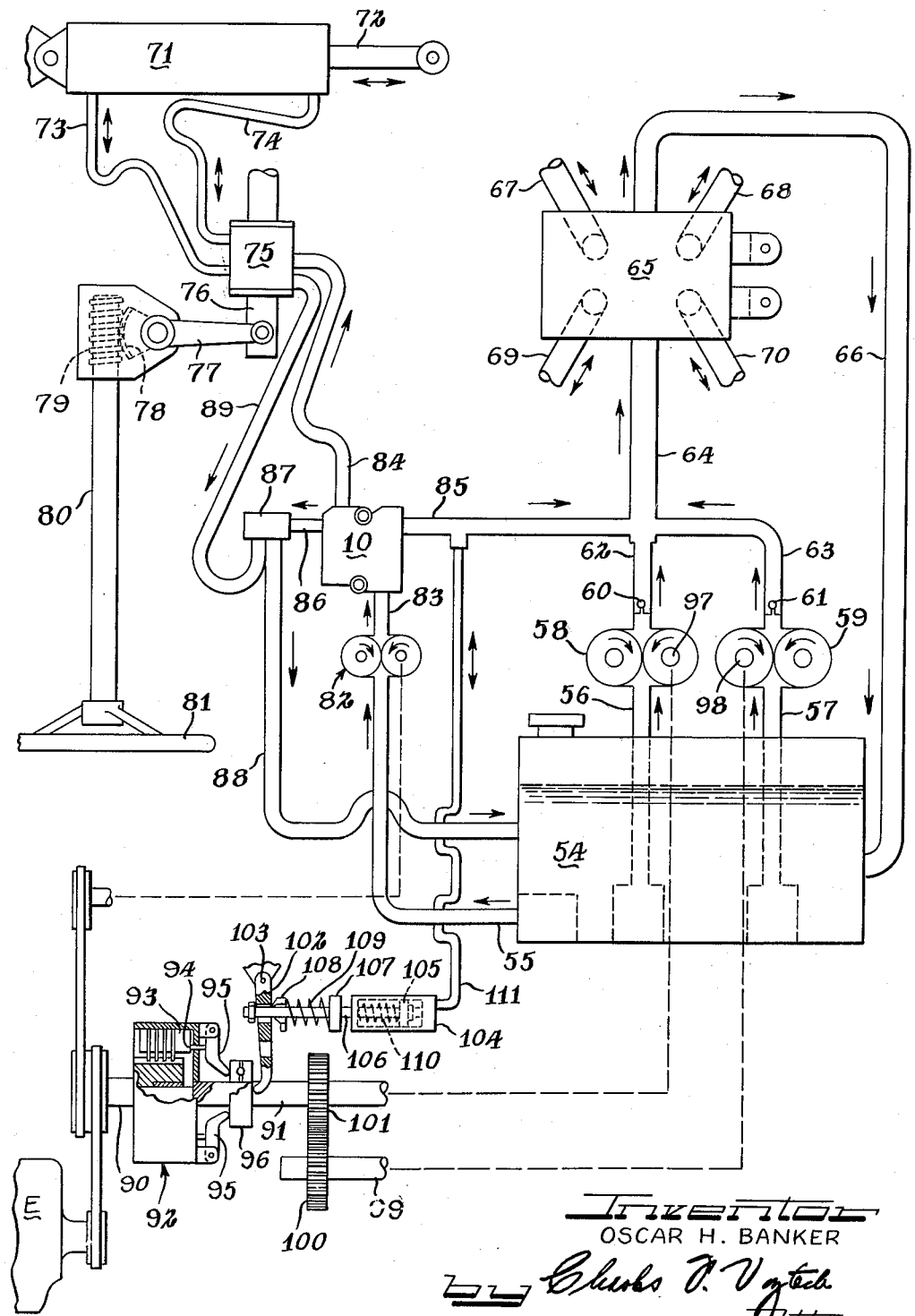
INVENTOR
OSCAR H. BANKER

United States Patent Office 3,101,594
Patented Aug. 27, 1963

3,101,594
HYDRAULIC SYSTEM INCORPORATING FLOW DIVIDER VALVES
Oscar H. Banker, Bay Village, Ohio, assignor, by mesne assignments, to Fawick Corporation, Cleveland, Ohio, a corporation of Michigan
Original application May 16, 1957, Ser. No. 659,587, now Patent No. 3,024,798, dated Mar. 13, 1962. Divided and this application Dec. 26, 1961, Ser. No. 161,947
8 Claims. (Cl. 60—52)

This invention relates to a system incorporating flow divider valves to establish a plurality of streams of fluid under pressure.

The present application is a division of my application Serial No. 659,587 for Flow Divider filed May 16, 1957 now Patent No. 3,024,798 granted March 13, 1962.

In heavy load carrying vehicles such as farm tractors which utilize hydraulic power for lifting earth working tools out of the ground and for power steering the vehicle, it has been customary to provide one or more pumps of sufficient size to handle the maximum load to be lifted by the vehicle and to provide a separate pump for supplying the fluid pressure necessary to effect the power steering. Under ordinary circumstances the power steering and the load lifting mechanism are seldom used simultaneously. This means that when the vehicle is in motion and is being steered, the pumps for supplying fluid under pressure to the load lifting mechanism are operating against full hydraulic pressure but the output of the pumps is being bypassed and performs no useful work. The drain on the power source for the pumps is thus unnecessarily high.

It is an object of this invention to provide a system for supplying the load lifting and power steering mechanisms of a vehicle such as a farm tractor with adequate fluid under pressure, but with a substantial reduction in the amount of power required to produce such pressure fluid.

As a more specific object, this invention seeks to provide a pump for supplying fluid under pressure to the load lifting mechanism of a vehicle with means for driving the pump in such manner that it is operated only when the vehicle is not being steered, and with a hydraulically operated power steering mechanism supplied by a continuously running pump, the output of which is utilized both to control the drive mechanism for the load lifting pump and to supply additional fluid under pressure to the load lifting hydraulic system to augment the capacity of the pump for that system.

These and other objects of this invention will become apparent from the following detailed description of the invention when taken together with the accompanying drawing in which the sole FIGURE is a schematic diagram of a system for operating hydraulically powered motors for moving a load and for steering a vehicle.

A system advantageously utilizing the flow dividing characteristics of the valves described in my aforesaid application Serial No. 659,587 is shown in the accompanying drawing. Referring now to the drawing, there is shown a tank or reservoir 54 of fluid having first, second and third outlets 55, 56 and 57, respectively. Outlets 56 and 57 conduct fluid from container 54 to pumps 58 and 59 which may be of the geared variety, both of which force fluid under pressure past ball check valves 60 and 61 into outlet passages 62 and 63 which are then combined into a single outlet passage 64. From passage 64, the fluid may go to a control valve 65 and then back, through a return conduit 66, to reservoir 54. Control valve 65 has passages 67, 68, 69 and 70 leading to the work cylinders (not shown) for the earth moving tools. Valve 65 may be of any construction suitable for the functions to be performed, the details of which form no part of this invention.

It has been found to be more economical to use two small pumps rather than one large pump on earth moving equipment where a supply of fluid under pressure is required to operate the cylinders connected to the earth moving tools. It is also customary to connect the pumps directly to the prime mover for the vehicle for the earth moving equipment so that whether or not work is being performed, the prime mover is required to supply power for running the pumps. This power when supplied during idle periods of the earth working tool or implement, is wasted. In the system hereinafter to be described such waste of power is eliminated.

In the system illustrated in FIG. 1, it may be assumed that the vehicle is equipped with a power operated steering device using a double acting cylinder 71 having a rod 72 connected to the steered wheels (not shown) and having fluid conducting passages 73 and 74 connecting the cylinder 71 with a control valve shown in outline at 75. Said valve 75 may be of the open center type commonly used for such purposes and may be an improved type such as is shown in my U.S. Patent No. 2,879,748. Valve 75 is provided with a control element 76 pivotally connected to an arm 77 driven by a worm wheel sector 78 from a worm 79 fixed to the steering post 80 and steering wheel 81 of the vehicle.

Fluid under pressure for operating cylinder 71 is supplied from reservoir outlet 55 through a gear type pump 82 connected to a flow divider valve 10 which may be identical with the valve shown in my aforesaid pending application Serial No. 659,587, the connection being effected by a fluid inlet conduit 83 connected to the inlet opening of valve 10. A controlled flow outlet conduit 84 conducts fluid under pressure from the controlled flow opening of valve 10, an excess flow conduit 85 connects the excess flow opening of valve 10 to the single outlet passage 64 leading to valve 65, and a relief conduit 86 connects the relief opening of valve 10 through a suitable fitting 87 to a return conduit 88 leading back to reservoir 54. The exhaust fluid from power steering valve 75 is conducted to fitting 87 through a conduit 89 and thence through return conduit 88 to reservoir 54.

Gear pump 82 may be driven from the prime mover for the vehicle a fragment of which is shown schematically at E and made to operate whenever the prime mover is running so that fluid under pressure is available for steering the vehicle when the vehicle is conditioned to move. The specific form of the drive from the engine to pump 82 is not a part of this invention and hence will not be described in detail herein. Thus fluid will always be available in the controlled flow conduit 84 and in excess flow conduit 85 when the vehicle prime mover is running. This fluid will simply be vented through valves 75 and 65 when no demand for fluid under pressure is made by work cylinder 71 or the cylinders controlled by valve 65, and the pressure in conduits 84 and 85 will accordingly be substantially zero. If, however, there is a demand for fluid under pressure in either conduit 84 or 85, then the operation of valves 75 and 65 will result in closing the vent passages therein (not shown) and the desired pressure will be built up in conduit 84 and 85 or both as the case may be. In the majority of situations, the power steering mechanism is not used when the earth working tool controlled by valve 65 is in operation and vice versa and hence a considerable saving in power can be effected by disconnecting pumps 58 and 59 when the vehicle is moving and the power steering cylinder 71 is in use. The mechanism by which this desirable saving can be effected will now be described.

Referring again to the drawing, there is shown a drive shaft 90 which is driven in unison with the vehicle engine E so that power to drive the gear pumps 58 and 59 is continuously available when the engine is running. drive shaft 90 is connected to a driven shaft 91 through a friction clutch 92 which may be of the multiple plate type having a pressure plate 93 controlled through a plurality of pins 94 from a similar plurality of levers 95 and an axially slidable clutch collar 96. The levers 95 and pins 94 are so related that the clutch is engaged when collar 96 is slid to the left as viewed in the drawing, and is released upon movement of the collar 96 to the right.

Shaft 91 is connected by any suitable means to the drive shaft 97 of pump 58. Drive shaft 98 of pump 59 is connected by any suitable means to a shaft 99 on which is mounted a gear 100 meshing with a gear 101 mounted on and driven by shaft 91. Thus pumps 58 and 59 are driven from drive shaft 90 through clutch 92 whenever the latter is engaged.

The operation of clutch 92 is controlled by a fork 102 pivoted to some fixed point on the vehicle at 103, and is oscillated about pivot 103 by a pressure fluid operated cylinder 104 having a piston 105 fixed to a piston rod 106 and having an abutment 107 fixed to rod 106. A collar 108 is slidably mounted on rod 106 and made to bear against fork 102 by a spring 109. A return spring 110 is disposed in cylinder 103 and is compressed between piston 105 and the left hand (as viewed in the drawing) cylinder head of cylinder 104. Fluid under pressure is introduced into cylinder 104 to the right hand side (as viewed in the drawing) of piston 105 from a conduit 111 conncted to excess flow conduit 85 so that piston 105 is subject at all times to the pressure in said excess flow conduit. When such pressure is applied to piston 105 the latter will move to the left as viewed in the drawing to move abutment 107 and collar 108 in the same direction, the latter through spring 109. This causes fork 102 to swing in a clockwise direction about its pivot 103 as viewed in the drawing to urge collar 96 and levers 95, pins 94 and pressure plate 93 in the clutch engaging direction. Venting of pressure in conduit 85 allows return spring 110 to move piston 105, rod 106 and abutment 107 to the right as viewed in the drawing to relieve fork 102 of pressure and thereby relieve pressure plate 93 of operating pressure to release clutch 92.

The operation of the system is as follows:

When the prime mover for the vehicle is not running, pumps 58, 59 and 82 are not driven and no pressure is available to operate any of the work cylinders on the vehicle. When the prime mover is running, pump 82 is driven and fluid under pressure is available at flow divider valve 10, cylinder 71 and in excess flow conduit 85 and hence in valve 65 to a limited extent, depending upon the size of pump 82, check valves 60 and 61 serving to prevent loss of fluid pressure through pumps 58 and 59. Should valve 65 be operated to cause one of the work cylinders controlled thereby (not shown) to be operated, and allowing pressure to build up in the system, the same pressure will cause an operation of piston 105 as described above to engage clutch 92, whereupon shafts 91 and 99 will be driven to drive pumps 58 and 59 and supply fluid under pressure to valve 65.

With pumps 58 and 59 operating only when needed, a considerable economy of fuel consumed by the prime mover is effected, and the utilization of the excess flow from valve 10 to augment the fluid from pumps 58 and 59 effects still greater economy of fuel.

The life of the pumps 58 and 59 is prolonged and the build-up of heat in reservoir 54 is avoided by the greatly reduced circulation of the fluid.

It is understood that the specific form of valve 65 is not material to this invention, nor is the number of such valves used in the system. It is also understood that pumps 58 and 59 will be provided with relief valves to prevent the build-up of excessive pressures in outlet passages 62 and 63. The scope of the invention therefore is not to be limited to the illustrative embodiment described herein, but is to be determined by the appended claims.

I claim:

1. In combination in a pressure fluid system, a drive shaft, first and second control valves, a first pump connected to be driven by the drive shaft, a flow divider interposed between the first pump and the first control valve and having an inlet opening receiving the output from the said first pump, a controlled flow outlet connected to the first valve, and an excess flow outlet; a second pump having an outlet connected to the second valve, a conduit connecting the excess flow to the outlet of the second pump, and means for connecting the second pump to the drive shaft.

2. In combination in a pressure fluid system, a drive shaft, first and second control valves, a first pump connected to be driven by the drive shaft, a flow divider interposed between the first pump and the first control valve and having an inlet opening receiving the output from the said pump, a controlled flow outlet connected to the first valve and an excess flow outlet; a second pump adapted to be driven from the drive shaft and having an outlet connected to the second valve, a conduit connecting the excess flow to the outlet of the pump, said second valve being adapted to vent the output of the second pump, and means responsive to the venting of the output of the second pump for disconnecting the second pump from the drive shaft.

3. In combination in a pressure fluid system, first and second drive shafts adapted to be driven simultaneously, first and second control valves, a first pump connected to be driven by the first shaft, a flow divider interposed between the first pump and first control valve and having an inlet opening receiving the output from the said first pump, a controlled flow outlet connected to the first valve, and an excess flow outlet; a second pump having an outlet connected to the second valve, a conduit connecting the excess flow to outlet of the second pump such that the excess flow outlet is subject to the pressure in the second pump outlet, disconnectible means for connecting the second drive shaft to the second pump to drive the latter, and means responsive to the pressure in the excess flow outlet for controlling the operation of the disconnectible means.

4. The combination described in claim 3, and a check valve in the second pump outlet to prevent loss of pressure from the excess flow outlet through the said second pump.

5. The combination described in claim 3, said disconnectible means comprising a clutch having a shiftable member for controlling engagement of the clutch, and said means for controlling the disconnectible means comprising a pressure differential operated device having an element movable in response to the establishment of a pressure differential in the pressure differential operated device, and means for transmitting the movement of the said element to the shiftable member.

6. In combination in a pressure fluid system, first and second drive shafts, a first pump means connected to the first drive shaft and driven thereby, a pressure differential operated cylinder, a flow divider having controlled and excess flow outlets, said flow divider having also an inlet connected to the output of the first pump means, a control valve connected to the controlled flow outlet and controlling the application of fluid under pressure to the pressure differential operated cylinder, a second pump means, a second control valve controlling the output of the second pump, a conduit connecting the excess flow outlet with the output of the second pump, disconnectible means for driving the second pump from the second drive shaft, and means responsive to the pressure in the excess flow outlet for controlling the disconnectible means.

7. In a vehicle having a prime mover, pressure differential operated steering mechanism and a pressure differential operated load moving mechanism; a first pump for supplying fluid under pressure to the steering mechanism, a second pump for supplying fluid under pressure to the load moving mechanism, a flow divider mechanism having an inlet connected to the outlet of the first pump and having an excess flow outlet connected to the pressure differential operated load moving mechanism, said first pump being driven in unison with the operation of the prime mover, clutch means for connecting the second pump to the prime mover, and means responsive to the pressure in the excess flow outlet for controlling the engagement of the clutch means such that said clutch means is engaged to drive the second pump when substantial pressure is developed in the excess flow outlet.

8. In a vehicle having a prime mover as described in claim 7, a valve controlling the operation of the pressure differential operated load moving mechanism and adapted to vent the output of the second pump, thereby controlling the pressure in the excess flow outlet and the operation of the clutch control means.

No references cited.